United States Patent [19]

Mack

[11] Patent Number: 5,072,954
[45] Date of Patent: Dec. 17, 1991

[54] DRILL CHUCK WITH POSITION INDICATOR

[75] Inventor: Hans-Dieter Mack, Sontheim, Fed. Rep. of Germany

[73] Assignee: Günter H. Röhm, Sontheim, Fed. Rep. of Germany

[21] Appl. No.: 625,678

[22] Filed: Dec. 7, 1990

[30] Foreign Application Priority Data

Dec. 8, 1989 [DE] Fed. Rep. of Germany .... 3940587.7

[51] Int. Cl.⁵ .............................................. B23B 31/02
[52] U.S. Cl. ........................................ 279/60; 279/61
[58] Field of Search ...................... 408/16; 279/60, 61, 279/62, 63, 111

[56] References Cited

U.S. PATENT DOCUMENTS

| | | | |
|---|---|---|---|
| 369,489 | 9/1887 | Wilder | 279/111 |
| 609,019 | 8/1898 | Gibbs | 279/111 |

FOREIGN PATENT DOCUMENTS

| | | | |
|---|---|---|---|
| 3437960 | 4/1986 | Fed. Rep. of Germany | 279/111 |
| 3528851 | 2/1987 | Fed. Rep. of Germany | 279/111 |
| 3809316 | 3/1988 | Fed. Rep. of Germany | . |
| 583004 | 12/1946 | United Kingdom | 279/60 |

*Primary Examiner*—Daniel W. Howell
*Attorney, Agent, or Firm*—Herbert Dubno; Andrew M. Wilford

[57] ABSTRACT

A drill chuck has a chuck body centered on and rotatable about an axis and formed with a plurality of guides angularly equispaced about the axis, respective jaw displaceable axially in the guides, an adjustment body rotatable about the axis on the body, and screwthreads coupling the adjustment body with the jaws for axial forward movement of the jaws on the body on rotation of the adjustment body on the chuck body in one direction and opposite axial backward movement on opposite relative rotation of the bodies. An indicator element is provided between the chuck and adjustment bodies. A screwthread coupling centered on the axis is provided between the element and one of the bodies and a translatory coupling is provided between the element and the other of the bodies. Thus the indicator element moves in a straight line relative to the other body on relative rotation of the bodies.

12 Claims, 5 Drawing Sheets

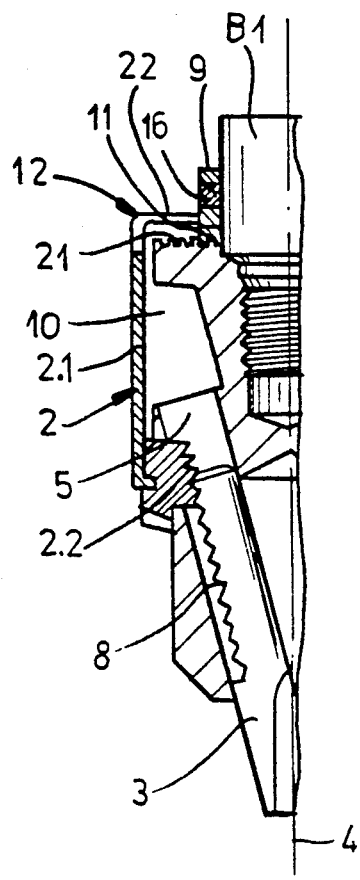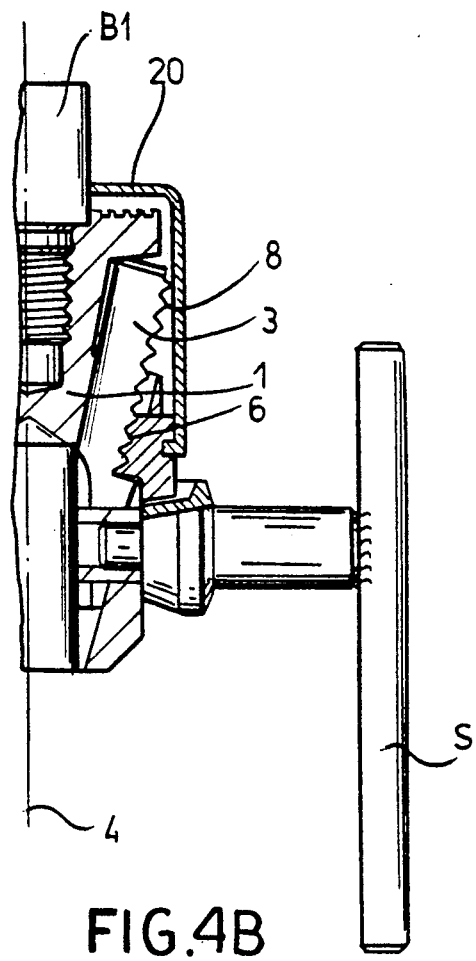
FIG.4A  FIG.4B
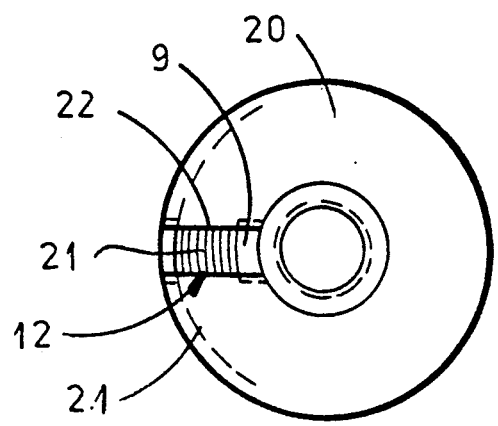
FIG.5

5,072,954

DRILL CHUCK WITH POSITION INDICATOR

FIELD OF THE INVENTION

The present invention relates to a drill chuck. More particularly this invention concerns such a chuck provided with an indicator that shows what position the chuck is in.

BACKGROUND OF THE INVENTION

A standard drill chuck that is rotated about an axis of a drill spindle to rotate a drill bit about the axis has a chuck body secured to the spindle and formed centered on the axis with a screwthread. An adjustment sleeve rotatable but axially nondisplaceable on the chuck body is formed angularly equispaced about the axis with a plurality of angled jaw guides. Alternatively it is possible to form the guides on the chuck body and the screwthread on the sleeve for the same effect. Respective jaws in the guides have racks that mesh with the screwthread so that rotation of the sleeve body on the chuck body about the axis in a tightening direction moves the jaws radially together and opposite rotation in a loosening direction moves the jaws radially apart.

It is known from German patent document 3,809,316 to form a window in the sleeve and to provide one of the jaws with an indicator or pointer that is visible through this window so that the user can see the position the chuck is in. The pointer can move relative to a scale indicating the diameter of the drill bit held in the chuck.

Such an arrangement can only be used in a particularly constructed chuck, that is the chuck must be of nonstandard construction to carry the necessary indicator which may be formed as a spreadable ring engaged around the rear ends of all the jaws. In addition this type of arrangement is not readily adaptable to a remote position reader or detector.

OBJECTS OF THE INVENTION

It is therefore an object of the present invention to provide an improved drill chuck with a jaw-position indicator.

Another object is the provision of such an improved drill chuck with a jaw-position indicator which overcomes the above-given disadvantages, that is which can be used on a chuck which is otherwise of standard construction and that can be interfaced readily with a remote position reader or detector.

SUMMARY OF THE INVENTION

A drill chuck according to the invention has a chuck body centered on and rotatable about an axis and formed with a plurality of guides angularly equispaced about the axis, an adjustment body rotatable about the axis on the body, respective jaw displaceable axially between the bodies in guides formed in one of the bodies, and screwthreads coupling the adjustment body with the jaws for axial forward movement of the jaws on rotation of the adjustment body on the chuck body in one direction and opposite axial backward movement on opposite relative rotation of the bodies. An indicator element is provided between the chuck and adjustment bodies. A screwthread coupling centered on the axis is provided between the element and one of the bodies and a translatory coupling is provided between the element and the other of the bodies for movement transverse of the screwthreads of the screwthread coupling. Thus the indicator element moves in a straight line relative to the other body on relative rotation of the bodies.

With this system as the chuck body and adjustment body are rotated relative to each other to adjust the positions of the jaws, the indicator element moves along its translatory coupling. The position of the indicator element will therefore be directly related to that of the chuck jaws. Since the indicator is not carried on the jaws it is relatively easy to connect it with some sort of remote reading device to provide remote detection of the jaw position.

According to the invention the screwthread formations include teeth on the jaws and a screwthread on the adjustment body and the indicator includes a sensible part on the indicator element. A sensing element fixed adjacent the chuck and juxtaposed with the sensible part for detecting the position of same. The part can be a ferrite or magnetic plug and the sensing element can be a coil.

Furthermore according to the invention the screwthread coupling is an internal screwthread on the adjustment body and an external screwthread on the indicator element meshing with the screwthread of the adjustment body. The translatory coupling is an axially effective slide joint between the chuck body and the indicator element. In this case the element is a ring engaged around the chuck body within the adjustment body, the adjustment body being a sleeve.

It is also possible in accordance with the invention for the screwthread coupling to be a screwthread on the chuck body and a screwthread on the indicator element meshing with the screwthread of the chuck body. Here the adjustment body is a sleeve coaxially surrounding the chuck body and the indicator element and the translatory coupling is formed by an axially extending slot formed in the sleeve and a radial projection of the indicator element engaged in the slot.

In yet another system of this invention the chuck body has an axially directed rear end face and the screwthread coupling is a spiral screwthread formed on the rear face and engaging the indicator element. The translatory coupling is a radially extending slot formed in the adjustment body and slidably receiving the indicator element.

BRIEF DESCRIPTION OF THE DRAWING

The above and other objects, features, and advantages will become more readily apparent from the following, reference being made to the accompanying drawing in which:

FIGS. 3A, 3B and 4A, 4B are partial views like FIGS. 2A, 2B of third and fourth embodiments; and FIG. 5 is a top end view of the chuck of FIGS. 4A and 4B.

SPECIFIC DESCRIPTION

Figure 1A:
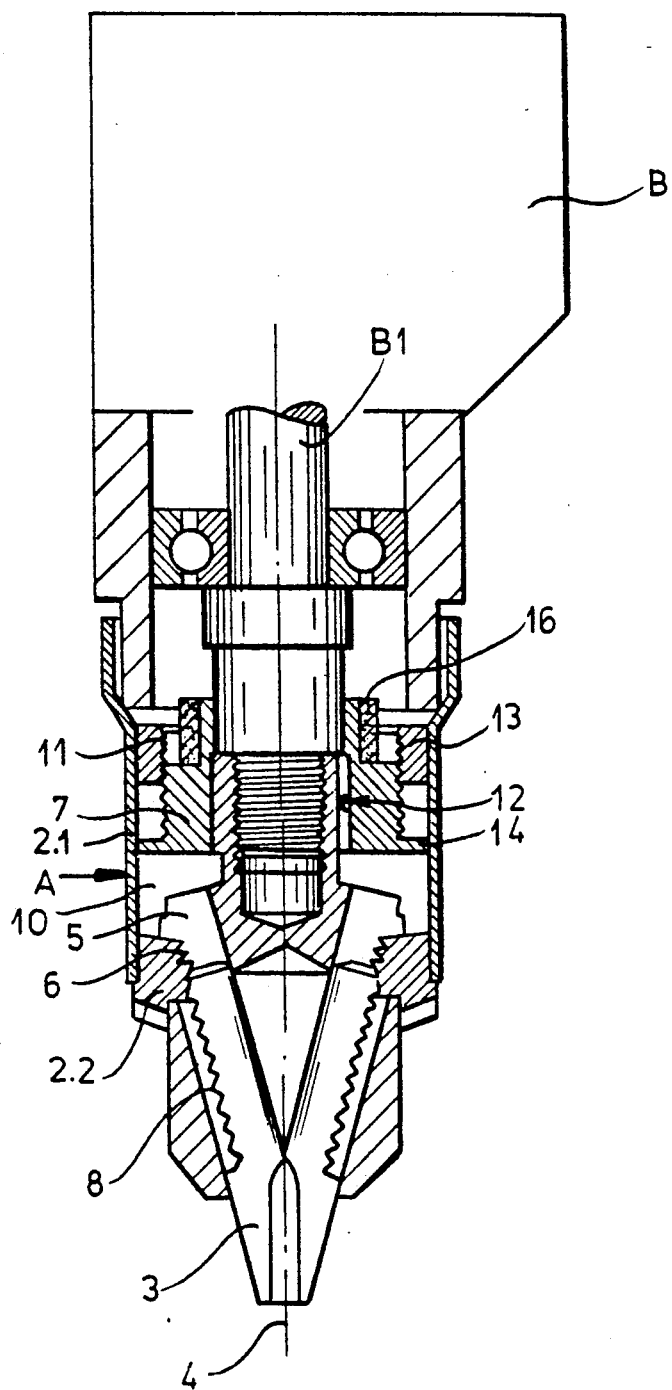
FIG. 1A is an axial section through a first embodiment of the chuck of this invention with the jaws fully forward.
Figure 1B:
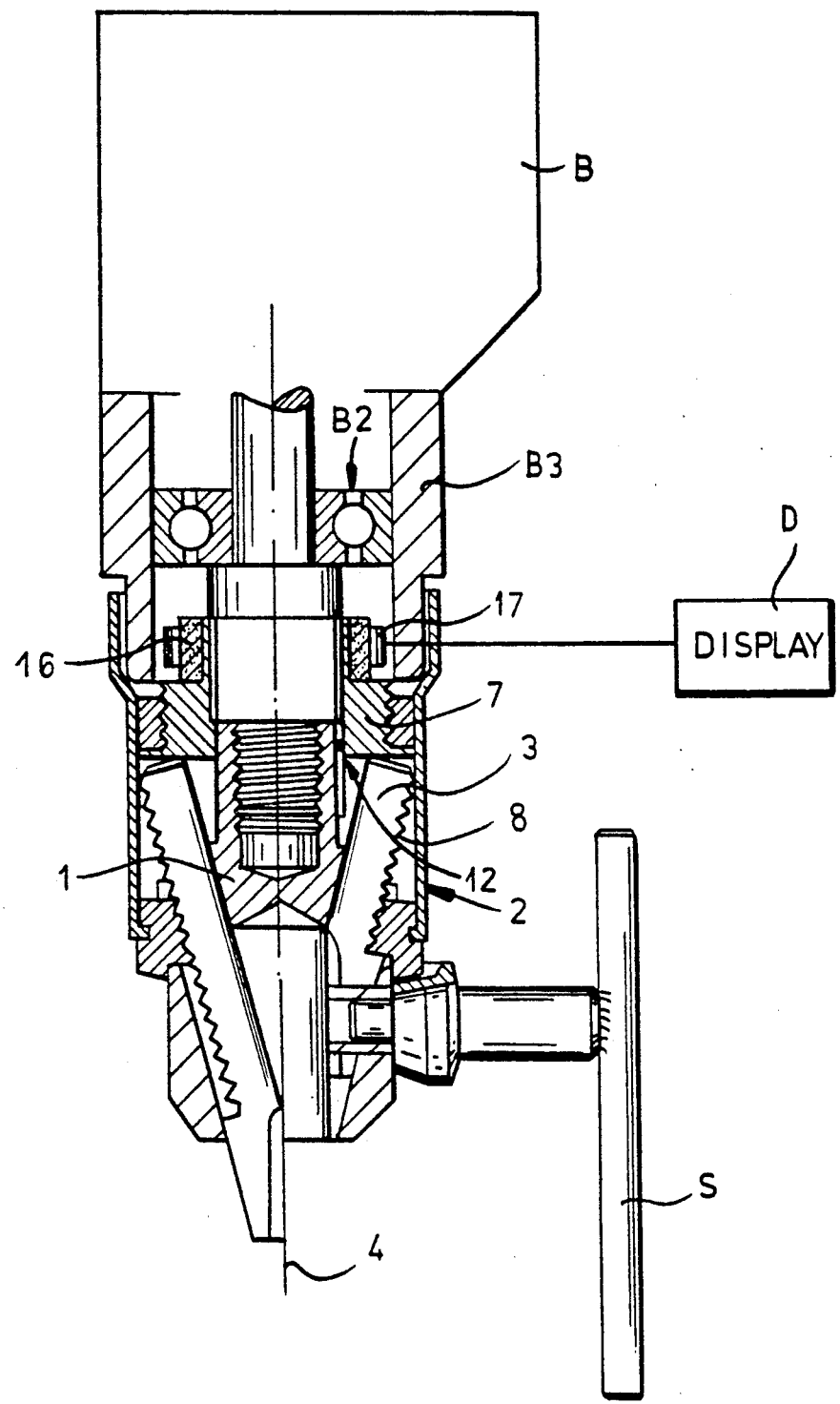
FIG. 1B is a view like FIG. 1A but with the jaws fully back.

As seen in FIGS. 1A and 1B a chuck A according to this invention is carried on a drill B having a drive shaft B1 carried in a bearing B2 in a nose B3 of the drill B.

The chuck A has a chuck body 1 threaded on the front end of the shaft B1 for rotation about an axis 4 of the shaft B1. In addition this chuck A is formed with three angularly equispaced guide holes 5 extending along respective axes inclined to the axis 4 and receiving respective jaws 3 (the section of FIG. 1A being taken along a plane that is inflected at the axis 4 to run centrally through two jaws 3) that are mainly of circular section but that have outer edges formed with rows of teeth 8.

A tightening sleeve 2 can rotate on the chuck body 1 but not move axially thereon. It is formed as a sheet-metal tube 2.1 that has a front end provided with a split ring 2.2 that is internally formed with a frustoconical screwthread 6 that meshes with the teeth 8 of the jaws 3 to moved them axially forward and radially together when rotated in one direction and axially backward and radially apart when oppositely rotated. The jaws 5 can be exposed at their rear ends at a space 10 into which the rear ends of the guide holes 5 open. This construction is all standard.

According to this invention the rear part of the sleeve 2 carries a ring 13 that rotates with it. The chuck body 1 carries a position-indicating element 7 formed as a ring having at its front edge a seal lip 14 that rides on the inside surface of the sleeve 2.1. This element 7 is connected to the body 1 via a coupling 12 that is formed as an axially extending and radially outwardly open groove in the body 1 and a radially inwardly projecting pin on the ring 7 that serves to rotationally couple the body 1 to the element 7 while permitting these parts to move axially relative to each other. In addition a screwthread coupling 11 constituted as an external thread on the element 7 and an internal thread on the ring 13 is provided between the parts 7 and 13. Thus as the sleeve 2 is rotated on the body 1 the element 7 will move axially in one direction or the other.

The indicating ring 7 carries a ferrite ring 16 and the nose B3 of the drill B carries a sensing coil 17 connected to a control and display indicated schematically at D in FIG. B. The coil 17 can therefore detect the axial position of the element 16 and thereby provide at D a readout of the position of the jaws 3.

Figure 2A:
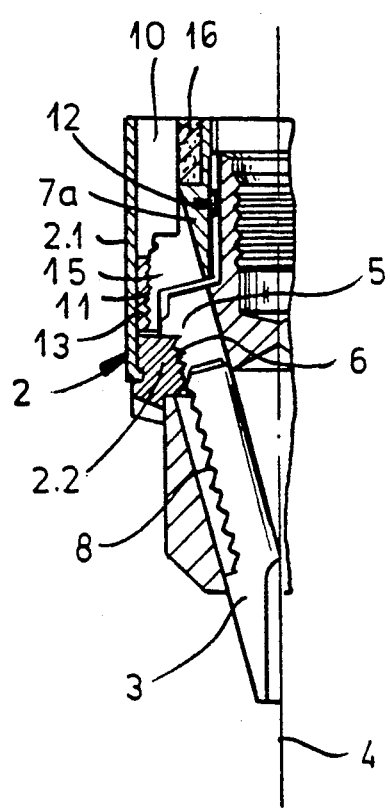
FIGS. 2A and 2B are partial views in axial section of a second embodiment also respectively showing the jaws forward and back.
Figure 2B:
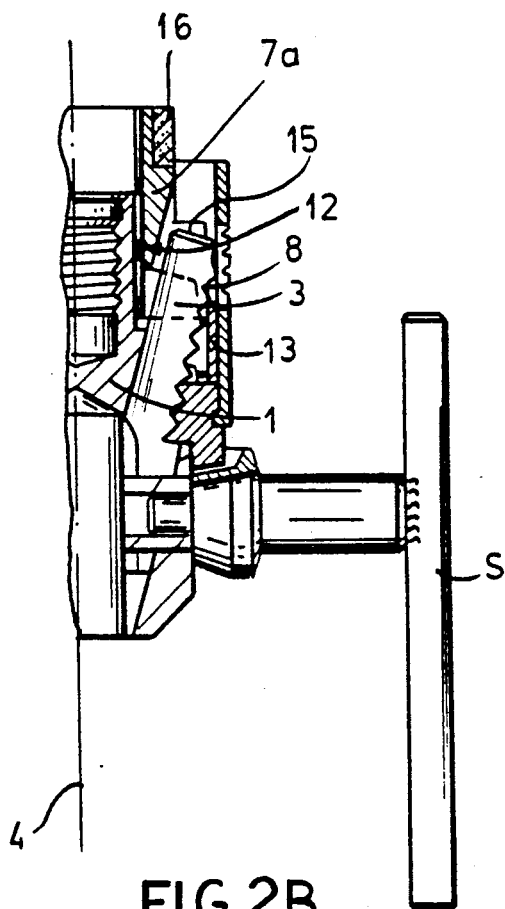

FIGS. 2A and 2B shows an arrangement where a ring 7a is formed with holes 15 aligned with the guide holes 5 for the jaws 3 so that same can poke back through this ring 7a when fully retracted as shown in FIG. 2B. This arrangement is characterized by being particularly short axially.

Figure 3A:
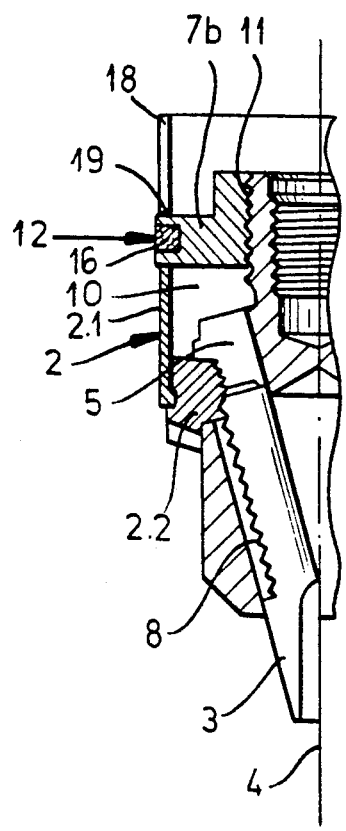
Figure 3B:
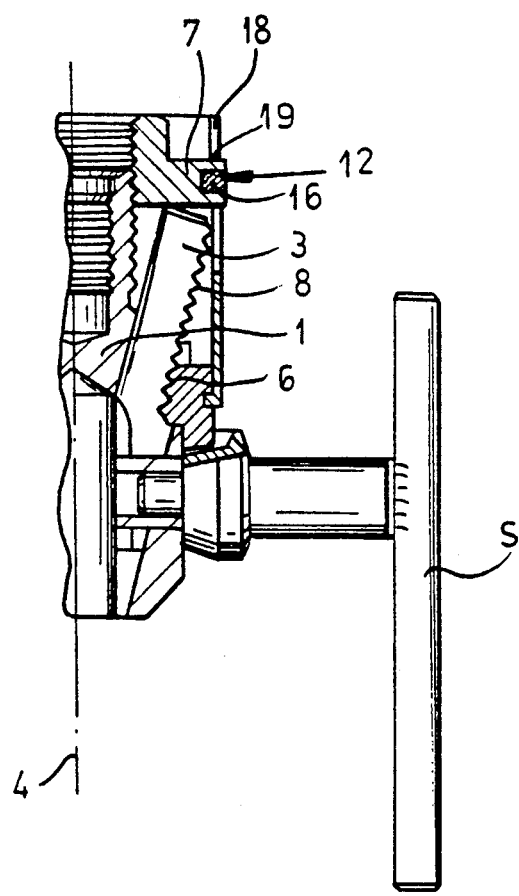

In FIGS. 3A and 3B a ring 7b is secured by the screwthread coupling 11 to the chuck body 1 and the sleeve is formed with a slot 18 forming with radial extensions of the ring 7b the translatory coupling 12. Thus as the chuck body 1 and sleeve 2 are relatively rotated about the axis 4 the ring 7 will be screwed axially along in the chuck.

FIGS. 4A, 4B, and 5 show yet another arrangement where a position-indicating ring element 9 taking the place of the ring 7, 7a, or 7b can move radially in a slot 22 formed in a rear wall 20 of the sleeve 2 and forming therefore the rotational coupling 12. The rear end of the chuck body 1 is formed with a spiral screwthread 21 meshing with teeth on the front face of the element 9 and forming therewith the screwthread coupling 12. Thus as the sleeve 2 and body 1 rotate relative to each other the element 9 will move radially in the slot 22 and its radial position will indicate the positions of the jaws 3.

I claim:

1. A drill chuck comprising:
   a chuck body centered on and rotatable about an axis;
   an adjustment body rotatable about the axis on the body;
   jaws spaced about the axis between the bodies;
   means including screwthread formations coupling the bodies with the jaws for axial forward movement of the jaws on rotation of the adjustment body on the chuck body in one direction and opposite axial backward movement on opposite relative rotation of the bodies;
   an indicator element between the chuck and adjustment bodies; and
   means including
      a screwthread coupling centered on the axis between the element and a one of the bodies, and
      a translatory coupling between the element and the other of the bodies,
   for straight-line movement of the indicator element relative to the other body on relative rotation of the bodies.

2. The drill chuck defined in claim 1 wherein the screwthread formations include teeth on the jaws and a screwthread on the adjustment body.

3. The drill chuck defined in claim 1, further comprising
   indicating means includes a sensible part on the indicator element, and
   a sensing element fixed adjacent the chuck and juxtaposed with the sensible part for detecting the position of same.

4. The drill chuck defined in claim 1 wherein the screwthread coupling is an internal screwthread on the adjustment body and an external screwthread on the indicator element meshing with the screwthread of the adjustment body, the translatory coupling being an axially effective slide joint between the chuck body and the indicator element.

5. The drill chuck defined in claim 4 wherein the element is a ring engaged around the chuck body within the adjustment body, the adjustment body being a sleeve.

6. The drill chuck defined in claim 1 wherein the screwthread coupling is a screwthread on the chuck body and a screwthread on the indicator element meshing with the screwthread of the chuck body.

7. The drill chuck defined in claim 6 wherein the adjustment body is a sleeve coaxially surrounding the chuck body and the indicator element and the translatory coupling is formed by an axially extending slot formed in the sleeve and a radial projection of the indicator element engaged in the slot.

8. The drill chuck defined in claim 1 wherein the chuck body has an axially directed rear end face and the screwthread coupling is a spiral screwthread formed on the rear face and engaging the indicator element.

9. The drill chuck defined in claim 8 wherein the translatory coupling is a radially extending slot formed in the adjustment body and slidably receiving the indicator element.

10. A drill chuck comprising:
    a chuck body centered on and rotatable about an axis;
    an adjustment body rotatable about the axis on the body;
    jaws spaced about the axis between the bodies;
    means including screwthread formations coupling the bodies with the jaws for axial forward movement of the jaws on rotation of the adjustment body on the chuck body in one direction and opposite axial backward movement on opposite relative rotation of the bodies;

an indicator element between the chuck and adjustment bodies;

a screwthread coupling centered on the axis between the element and one of the bodies, the other body being formed with an axially extending slot in which the indicator element engages, whereby on relative rotation of the bodies the element moves along the slot.

11. The drill chuck defined in claim 10 wherein the slot extends axially.

12. The drill chuck defined in claim 10 wherein the slot extends radially.

* * * * *